3,529,993
POLYANHYDRIDE-POLYAMINE COATED SURFACE AND METHOD OF COATING

Lowell O. Cummings, San Anselmo, Calif., assignor to Pacific Vegetable Oil Corporation, San Francisco, Calif., a corporation of California
No Drawing. Filed Oct. 13, 1966, Ser. No. 586,387
Int. Cl. B05b *13/02, 7/26;* B44d *1/02;* C03c *17/00*
U.S. Cl. 117—105.5                    23 Claims

ABSTRACT OF THE DISCLOSURE

A substrate is coated with a composition comprising the reaction product of a reaction between a polyanhydride and one of the following polyamines: a condensation product of tung acrolein adduct and a lower amine, an amide-amine resin, the partial reaction product of an amine and an epoxy resin, and the reaction product of a lower polyamine and a methyl ester of a bodied drying oil. The coating is best applied by spraying solutions of the polyamine and polyanhydride simultaneously and directly on the substrate.

---

This invention relates to an improved coating composition and to a method for making and applying the same.

There are many places where the slow cure or drying of paints and other coating compositions cause difficulties. Delay in cure or drying necessitates not only waiting but careful handling of freshly coated materials and space where they can be held apart from other bodies. Moreover, it is not always feasible to achieve rapid cure by baking. Some materials that are to be coated do not withstand baking well, and baking necessarily consumes power and entails later cooling.

The present invention relates to a system wherein the coating cures very rapidly at room temperature.

The system of this invention is very adaptable to use in a production line, where pieces are handled a few minutes after spraying.

The system of this invention does not require further processing to cure the film. Other types of finishes require long drying times, or baking for curing, or in a few cases very expensive curing processes such as electron beam curing or other forms of radiation curing.

As my new process does not require heat and cures rapidly, it is especially adaptable to use in coating wood pieces which are to be stacked. Wood is affected by heat and cannot be subjected to extensive baking without the risk of changing the wood properties. Up to now it has been difficult to obtain fast cured coating on wood without resorting to baking or more exotic curing systems such as radiation curing.

In coating wood with primers intended for exterior use, it is recognized that a primer with a vehicle containing vegetable oils (e.g. linseed oil) has the best durability and resistance to cracking. Oils have good flexibility and have unsurpassed resistance to cracking on wood. The primer recognized throughout the exterior wood paint industry as the standard of excellence is Federal Specification TT–P–25a, a linseed oil based primer. This primer takes about two days of air drying before it is suitable for topcoating. The lumber industry is now marketing pre-primed and pre-finished siding for the home builders. The lumber industry in cooperation with the paint industry has long been striving to develop a long lasting factory-applied primer for this siding.

Primers have already been in production which are based on short oil alkyds. These have been deficient in resistance to cracking, as shown by many actual exposures. Furthermore, with short oil alkyl primers, baking has been required in order to obtain fast enough cure so that the primed siding could be stacked without sticking together at the end of the production line. This baking has been undesirable but, with the short oil alkyds, has been unavoidable.

One of the main uses anticipated for the rapid-curing primer of this invention is for factory-applied wood priming. My new rapid-curing primer can be made from components which are made from drying oils and therefore can impart the same resistance to wood cracking, due to their oil-type flexibility, as conventional oil based air dry primers such as TT–P–25a.

On the other hand, my new rapid-curing primers can alternatively be made from more resinuous components, such as alkyds and epoxy resin derivatives. These harder coatings are suitable for coating steel.

In fact these primers of this invention appear to give the steel rust resistance, due to amines in my new coating, for amines are known to aid rust resistance of coatings for steel.

There are many other instances where a rapid-cure no-baking primer for steel or other metal is useful, e.g. where baking is too expensive or not permitted, in applications on exterior structures where no baking is available, and where rapid topcoating is desirable. All that is needed is two separate spray guns with their accompanying paint reservoirs. These coatings may also be useful in traffic paints where virtually no waiting period is necessary for the paint to dry before traffic can pass.

Other objects and advantages of the invention will appear from the following description of some preferred forms thereof.

Basically, the invention is a coating formed by spraying a surface simultaneously with (a) a polyamine and (b) a polyanhydride.

POLYAMIDES

A polyamine, as the term is used herein, means any organic radical which contains two or more amine groups. Two or more primary amine groups are required for the aldehyde-amine reaction, but either primary or secondary amine groups can be used in the polyanhydride or polyisocyanate reactions.

The simplest polyamine is ethylene diamine,

Higher homologs of this are diethylene triamine,

and triethylene tetramine,

These simple polyamines can be used as the polyamine of this invention, but less volatile polyamines are better. For example, I have made high-molecular-weight polyamines that give excellent results herein by reacting tung acrolein adduct or epoxy resins with the simple polyamines shown above, where one aldehyde or epoxy group reacts with *only one* amine group of the polyamine, leaving one or more amine groups free.

The tung acrolein adduct reaction may be diagrammed as below.

It is important to react one aldehyde with one amine group only of the polyamine. To react two amine groups gives a polymer rather than the desired high-molecular-weight polyamine.

The chemical reaction between an amine and an aldehyde is known as Schiff's base reaction, a powerful reaction which takes place rapidly at room temperature and goes very nearly to completion even in the presence of Note that again only one amine group of each ethylene diamine is reacted with the epoxy group, in order to leave a free amine group. This reaction is not as vigorous as the Schiff's base reaction and does not take place rapidly at room temperature.

Another polyamine that works very well in the fast-curing coating reactions of this invention is the type of resin called a "poly-amide" resin. One brand of these is "Versamid" resins produced by General Mills. In actuality, they are amide-amine resins made from reacting dimer fatty acids and simple polyamines such as ethylene diamine, diethylene triamine, triethylene tetramine and so on. These can be represented by:

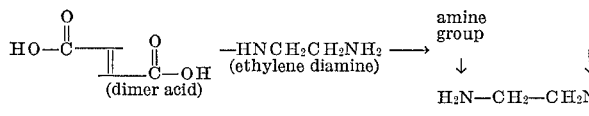

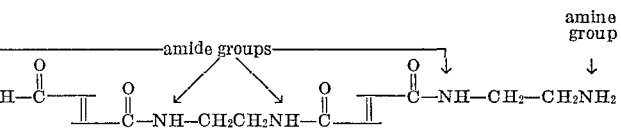

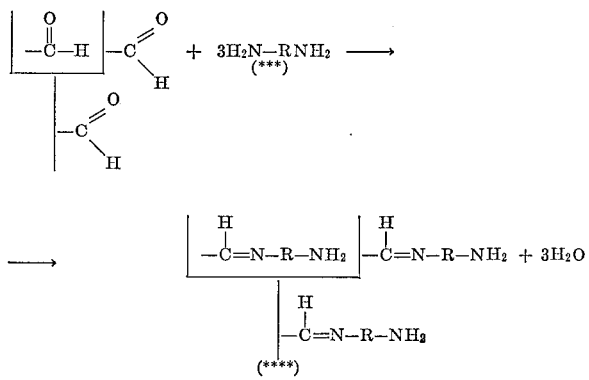

(\*\*\*) Triethylene tetramine.
(\*\*\*\*) Tung oil acrolein polyamine.

water. It will drive itself to completion in the presence of an excess of water, which is also a product of reaction. The reaction is illustrated in detail as:

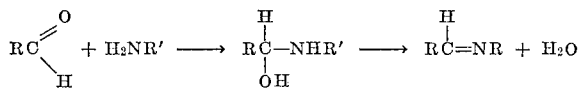

Example 1.—Making tung acrolein adduct 2500 g. tung oil is rapidly stirred in a glass kettle fitted with a reflux condenser. The oil is heated to 150° C. (302° F.) and 490 g. of acrolein is slowly added over an 18 hour period. The reaction gives a light tan oil, viscosity 9 stokes, Gardner color 6 to 7, acid value 3.9 and carbonyl equivalent of 0.198/100 g.

This reaction product is then condensed with a simple polyamine to get the higher molecular weight polyamine desired. For example, 50 grams of isopropyl alcohol, 100 grams of toluene, and 30.7 grams of triethylene tetramine are mixed in that order and to them are added slowly 100 grams of the tung-acrolein adduct, all at room temperature and atmospheric pressure. The reaction takes about an hour to produce the desired polyamine.

An example of an epoxy resin-simple polyamine reaction to make a higher molecular weight polyamine is:

Another polyamine useful in this invention is made by reacting a bodied drying oil with methanol and then reacting the resulting methyl ester with a suitable amine.

Example 2.—Making a polyamine employing a methyl ester of a bodied safflower oil Safflower oil bodied to Z–8 Gardner-Holt viscosity is used, 3233 parts by weight being mixed with 610 parts by weight of methanol which contains 39 parts by weight of sodium hydroxide.

After thorough mixing for about thirty minutes in a kettle containing a reflux condenser and stirrer, in an inert atmosphere such as nitrogen, the mixture is neutralized, as by adding a mixture of 60 parts by weight of sulfuric acid and sixty parts by weight of water. The resulting mixture is allowed to settle, a lower layer then separates out, is drained off, and glycerine recovered therefrom.

The resulting methyl ester of bodied safflower oil is washed, as by washing with hot water three times, until the water layer is approximately neutral. The yield should be about 100% of the oil weight charged; the viscosity is A–2 Gardner-Holt and the color 5 to 7.

The methyl ester of bodied safflower oil is then charged to a kettle, preferably of stainless steel fitted with a stirrer, an inert gas inlet tube, a distilling condenser, and a methanol receiver. To 3040 parts by weight of the ester are added 960 parts by weight of triethylene tetramine, and the mixture is stirred and heated in four hours to about 210° C. with a gentle stream of nitrogen sparge. The yield of safflower oil methyl ester polyamine is 3650 parts by weight, with about 331 parts by weight of distillate.

The color of the polyamine is 7–, its viscosity is Z–7 to Z–8, its amine number is about 200 (plus or minus 10), its specific gravity is .95 or 7.82 pounds per gallon.

POLYANHYDRIDES

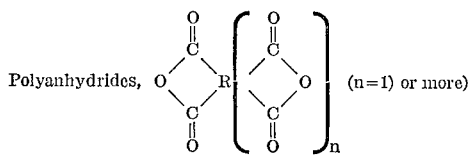

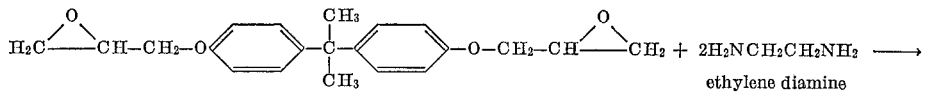

(Lowest molecular weight member of epichlorohydrin-bisphenol epoxy resin)

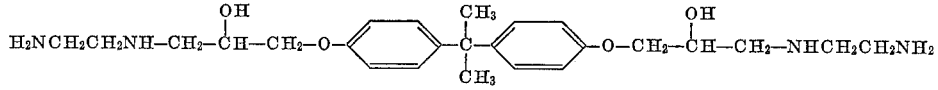

containing two or more organic acid anhydride groups are not often encountered among common organic chemicals. The reaction of vegetable oils or fish oils with maleic anhydride to produce a single molecule with an average of well over two anhydride groups is perhaps the most readily available polyanhydride.

The reaction of maleic anhydride with vegetable oils, and especially with conjugated vegetable oils, is well known. For the reaction with polyamines, a safflower maleic anhydride adduct containing 20% maleic anhydride has given the best films, although adducts ranging from 10 to 30% maleic anhydride have been successfully used. The manufacturing procedure shown below for this adduct can be applied for adducts with other concentrations of maleic anhydride from 0 to at least 30%.

Example 3

2400 grams of non-break safflower oil are added to a covered glass kettle fitted with a paddle stirrer, thermometer, heated glass funnel for the addition of maleic anhydride, a gas inlet tube extending below the oil surface, and one opening about ½″ diameter.

The oil is heated under a blanket of nitrogen to 480° F. Then melted maleic anhydride (held at about 200° F.) is added to the reaction flask at such a rate that a small amount of maleic anhydride refluxed an inch or so above the surface. In this manner 600 grams of maleic anhydride are reacted with the oil in two hours at 480° F. A slight exotherm is noted during the maleic anhydride addition. A stream of nitrogen at a fast rate may be used to blow out any unreacted maleic anhydride. Practically no maleic anhydride is observed to come off at this point. The cooled reaction product has the following analysis:

Yield—2978 g., 99%
Viscosity—330 stokes (Gardner Z-7)
Color (Gardner)—7 (very clear)
Acid value—168

(Acid value is done by weighing about two grams of reaction product in a mixture of about 100 g. of equal parts pyridine and water. This is boiled a few minutes to break up anhydride groups. An acid value done with ordinary solvents quite often shows about half this value.)

Example 4

This example is similar to Example 3, but uses linseed oil and a lower percentage of maleic anhydride.

2550 parts by weight of non-break linseed oil are heated to about 480° F. in a kettle equipped with stirrer, inert gas inlet tube, and temperature recorder. No reflux condenser is necessary. Then 450 parts by weight of melted maleic anhydride are added from a heated (60–90° C.) holding tank in two hours. There may be some exotherm during the addition. Free maleic anhydride should be less than 0.5 percent of total. Finally, sparge with inert gas (nitrogen or carbon dioxide) and cool.

REACTION OF A POLYANHYDRIDE AND A POLYAMINE

A typical reaction of this class of the invention is:

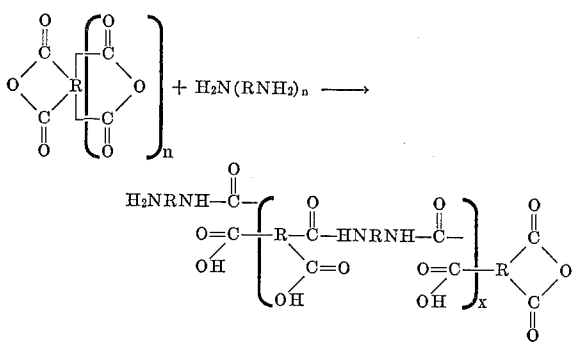

Here again the end groups may be both amine groups or both anhydride groups, depending which is in slight excess. The above reaction is depicted where one amine group reacts with one anhydride group, resulting in an amide group and a free carboxyl group.

However, if *more* than one amine group is reacted with one anhydride group, an ammonia salt type of grouping is formed from the reaction of the free carboxyl acid group and the amine. This ammonia salt type group is quite sensitive to water, and if enough of these groups are present in the polymer, the polymer can become water soluble. This is undesirable in primers or other coatings unless they are baked high enough to dehydrate the ammonia salt group to an amide group.

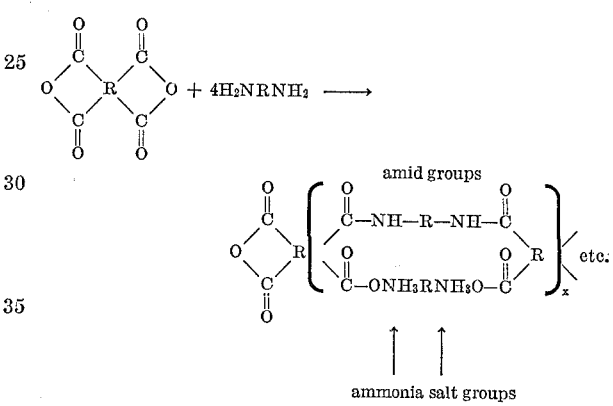

In the reactions of this invention it turns out that the best film properties result when the former conditions, one anhydride group reacting with one amine group, are used. This results in a polyamide film containing carboxyl groups.

THE METHOD OF APPLYING THE COATING

To explain the mode of the reaction as presently understood, the two reactants are mixed as quickly and as thoroughly as possible in a few seconds. During this mixing, the reactants are at first mutually soluble in each other for a brief instant and then they start to form a polymer. The polymer forms spontaneously at room temperature.

To test the reactants quickly, one of the reactants may be weighed into a small container, such as a paper cup or beaker. Then the second reactant is weighed into the same container, being careful not to mix the components. Then the components are mixed with a spatula as rapidly and as thoroughly as possible. Within 10 seconds of mixing the mixture becomes very viscous, and within less than a minute the mixture becomes completely gelled and impossible to stir.

The above test indicates the suitability of the reactants to be used as a coating. Films of these reactants are preferably made by simultaneously spraying the two components from two separate spray guns on the same area.

The sprayed droplets of the two components first mix and form a film on the sprayed surface, or perhaps some droplets mix while still traveling in the air. The film begins to harden almost at once. Typically the film will become solid and cured enough to be handled in a minute or two at room temperature.

The components are usually dissolved in a suitable solvent to give the optimum spraying properties. Usually the spraying viscosity is quite low. Much of the solvent evaporates in the spray, and the remainder evaporates from the film. The film hardens even though there is some solvent remaining. The evaporation of the solvent can be hastened by a heat source heating the film, but this is not necessary.

While clear coatings are quite good with this system, either of the two components can, of course, be pigmented to give paints. After suitable formulating, the resulting paints have the appearance of conventional paint.

Example 5.—Primer from safflower maleic anhydride adduct with polyamine made from epoxy resin and ethylene diamine A condensation product of safflower oil and maleic anhydride, is made as in Example 3 using 17% maleic anhydride instead of 20%. The acid value of this 17% maleic anhydride resin is 130. The resin is dissolved with equal parts of toluene to make solution (B).

A condensation product is made from an epoxy resin called Araldite 6020 (Ciba Chemical Co.) and ethylene diamine. The resin has a molecular weight per epoxy group of 200.

This is made by mixing 260 parts by weight of isopropanol, 260 parts by weight of toluene and 240 parts by weight of ethylene diamine in a stirred flask. This mixture is refluxed at 94° C., and a mixture of 260 parts by weight of isopropanol, 260 parts by weight of toluene and 800 parts by weight of Araldite 6020 epoxy resin is added to the refluxing mixture in 30 minutes. Final reflux temperature is 88° C. This results in a very light yellow, slightly viscous, clear solution, which is the solution (A) for this example.

Solutions (A) and (B) of this example are both pigmented with titanium dioxide, china clay and silica, so that the volume of pigment is about equal to the volume of non-volatile vehicle. This is sprayed in the same manner as described in Example 7 with a spray flow of 16 grams of pigmented solution (A) and 36 grams pigmented solution (B) sprayed in 15 seconds. This was sprayed on plywood and also on cardboard test panels. In two minutes the coating is cured and is very hard and smooth. This has been repeated using zinc chromate pigments and was then sprayed on steel panels. These had good adhesion to the metal.

Example 6.—Primer from safflower maleic anhydride adduct and a polyamine from tung acrolein adduct condensed with triethylene tetramine. Testing the primer for blocking.

A condensation product is made from tung acrolein adduct and triethylene tetramine, by mixing 307 parts by weight of triethylene tetramine and 650 parts by weight of n-propanol and 650 parts by weight of toluene in a stirred reaction flask at room temperature. Then 1000 parts by weight of the tung acrolein adduct are added over an hour's time, raising the temperature from 25° C. to 34° C., making a clear tan colored solution (A).

A safflower maleic anhydride adduct, made at 20% maleic anhydride content, exactly as described in Example 3, is dissolved in an equal weight of toluene to make solution (B).

Both of solutions (A) and (B) were pigmented and sprayed on plywood as in Example 5. A smooth white coating about 0.002" thick was deposited. It was held under an infra-red lamp for about 30 seconds to evaporate the solvent. At two minutes time after spraying, the coating is hard, at this time it may be tested for blocking properties by placing several one inch square pieces of composition boards on the painted surface and applying twenty pounds weight on each square. In tests, after sixteen hours at room temperature the weights and squares were removed from the paint surface without adhering to the paint, demonstrating the unusually good resistance to blocking or sticking of the fast curing primer coating. This film was observed to be very resistant to aromatic solvents.

Example 7.—Coating from a methyl vinyl ether maleic anhydride polymer and polyamine from epoxy resin condensed with ethylene diamine.

A polymer of methyl vinyl ether and maleic anhydride known as Gantrez AN 119 (General Aniline and Film Corp.) has a unit molecular weight per anhydride of 156. A solution of one part of this polymer in two aprts of acetone is solution (B). Solution (A) is the epoxy ethylene diamine polyamine described in Example 5. These are sprayed, using two conventional paint spray guns. The reservoir of one gun is filled with solution (A) and the other with solution (B). These are connected to air lines with 30 lbs./sq. inch pressure. The guns are attached together so that their nozzles are pointed toward the same point about three inches in front of the nozzles. Each gun is adjusted so that each sprays out 60 grams of solution per minute. Then they are sprayed at the same time on a test panel, holding the guns about 3" from the panel. A film of combined (A) and (B) forms immediately on spraying, and it starts to turn to a solid in ten seconds, becoming a soft solid film within thirty seconds. The film becomes progressively harder, and two minutes after spraying the film appears to be well cured.

Example 8.—Styrene maleic polymer and amine-amid dimer acid resin coatings

A styrene maleic anhydride polymer known as SMA S 3000 A (Socony Chemical Co.) acid value 275, is dissolved one part of polymer and two parts acetone to make solution (B). Solution (A) is a solution of 100 parts by weight of Versamid 140 in 50 parts by weight of isopropanol and 50 parts by weight of toluene.

These are sprayed out as in Example 7 in about equal weights, resulting in a hard cured film in two minutes.

Example 9.—A penetrating polyamine coating first followed by the two spray system In order to have excellent penetration into the wood cells, a first coat on wood is made by spraying wood with a tung acrolein-triethylene tetramine solution. This is allowed to penetrate a few moments, and then this surface is sprayed with the two gun system of tung acrolein-triethylene tetramine-safflower maleic anhydride combination. This worked very well. It appears that the amine penetrating coating has especially good affinity for wood.

Example 10

Example 9 was repeated, except that the penetrating coat was safflower maleic anhydride.

Example 11

A means of hardening the pigmented polyanhydride polyamine films is by using a bodied safflower oil (Z-8) derived polyamine with an amine value of 350 instead of 200. The higher amine value product is harder than the other and passes the blocking requirements.

Example 12.—Exposure tests

A method for finding the worth of primers intended for exterior wood surfaces is by coating the primers on one side of panels of douglas fir plywood. These panels are then exposed to the weather at 45° from vertical facing south. Uncoated plywood exposed in this manner will develop grain raising in a week or two. The raised grain areas will evolve into pronounced cracks in several weeks. Primers can be evaluated on their ability to prevent this grain raising and cracking when coated over portions of the plywood.

Strips of primers made from three of the two-spray rapid-curing systems using polyanhydrides and polyamines have been exposed on plywood in the above manner. As controls, strips of each of the same panels were coated with two primers which are now being used commercially in factory-coating wood. These are based on short oil alkyds and were baked on the plywood panel under infra-red lamps for 30 minutes.

The polyanhydride-polyamine primers were not subjected to heat, but were cured at room temperature within three minutes well enough to withstand 20 pounds per square inch without blocking.

Two different polyamine compositions were used, each in conjunction with the same polyanhydride. The two polyamine components $A_1$ and $A_2$ were prepared as follows:

POLYAMINE COMPONENT ($A_1$)

| Ingredient: | Parts by weight |
|---|---|
| Polyamine of the type of Example 2, derived from bodied safflower oil and triethylene tetramine, amine value 200 | 160 |
| Pigment, mixture of titanium dioxide, china clay, and silica | 360 |
| Toluene | 210 |
| | 730 |

POLYAMINE COMPONENT ($A_2$)

| Ingredient: | Parts by weight |
|---|---|
| Polyamine of the type of Example 2 but using more triethylene tetramine, amine value 350 | 160 |
| Pigment, same mixture of titanium dioxide, china clay and silica | 360 |
| Toluene | 160 |
| Isopropanol | 100 |
| | 780 |

The polyanhydride used was as follows:

POLYANHYDRIDE COMPONENT (B)

| Ingredients: | Parts by weight |
|---|---|
| Safflower maleic anhydride adduct of Example 3 | 160 |
| Pigment, same mixture of titanium dioxide, china clay, and silica | 360 |
| Toluene | 215 |
| | 735 |

Each mixture was ground in a paint mill and was placed in the reservoir of a respective spray gun and the two guns were sprayed on the plywood at 30 pounds pressure at the rates shown below. The primer was sprayed at about three mils dry-film thickness on a portion of a douglas fir plywood panel beside strips of the two commercial factory-coating primers of two to three mils thickness baked on as shown above.

The results are tabulated below:

Example 13.—Limits of the polyanhydride-polyamine ratio

Tests indicate that the ratio of the number of anhydride groups to the number of amine groups should lie within the range of 1:3 and 4:1. Much beyond these limits, the two-spray system generally fails to form a non-liquid film, producing merely a viscous liquid mix rather like either of the two viscous components.

The following mixtures indicate what happens at some ratios. The anhydride is the safflower-maleic anhydride adduct solution of Example 3, and the polyamine is the polyamine of the methyl ester of bodied safflower oil of Example 2. Both ingredients were simultaneously sprayed (as in Example 7) onto test panels of standard cardboard paint-out charts. The results are thus noted.

Ratio of amine groups to anhydride groups:     Results (a) 3:1 _____ Very sticky film, water sensitive but does not wash off with water; not cured.
(b) 1:1.63 _____ Cured film with some tackiness. Soft but not water sensitive.
(c) 1.1:1 _____ Slight tackiness. Soft cured film.
(d) 1.42:1 _____ Very slightly tacky. Somewhat waxy. Good cure.
(e) 1.74:1 _____ Very slightly tacky. Some mar resistance. Good cure.
(f) 2.3:1 _____ No tackiness. Very waxy. Good mar resistance and good cure.
(g) 3.3:1 _____ Tacky soft film.
(h) 5:1 _____ Very soft film but still a film, not a liquid.

Example 14.—Reacting a polyanhydride with methylene dianiline

| Ingredient: | Parts by weight |
|---|---|
| (A) | |
| p,p'-Methylenedianiline (4,4'-diaminodiphenylmethane) | 1 |
| Toluene | 1 |
| Isopropanol | 1 |
| Methyl ethyl ketone | 1 |
| (B) | |
| Safflower maleic adduct, Example 3 | 1 |
| Toluene | 3 |

Spray rate: (A) 7 g./15 sec.; (B) 14 g./15 sec.

This made a very glossy film that hardened to a firm, slightly soft film in five minutes. It was print free in 30 minutes. It passed the 200 g. Hoffman scratch hardness in two hours.

To those skilled in the art to which this invention relates, many changes in construction and widely differing embodiments and applications of the invention will suggest themselves without departing from the spirit and scope of the invention. The disclosures and the descrip-

| Ingredients: | Rate of spraying, g./min. | Exposure time, days | Condition of Primer | | |
|---|---|---|---|---|---|
| | | | Polyanhydride Polyamine Primer | Alkyd Primer No. 1 | Alkyd Primer No. 2 |
| $A_1$-B | 48 / 32 | 80 | Very slight grain raising. Few cracks upper half. | Grain raising and cracking upper ⅔rds of panel. | Some grain raising. Long cracks lower part of panel. |
| $A_1$-B | 68 / 60 | 75 | Slight grain raising, no cracking. | Considerable grain raising, some cracking at edges. | Considerable grain raising, some cracking, slight peeling. |
| $A_2$-B | 120 / 60 | 67 | Slight grain raising and very slight cracking lower half of panel. | Grain raising and fair amount of cracking lower half of panel. | Grain raising and slight cracking lower half of panel. |

I claim:

1. A substrate coated with a composition comprising the reaction product of the reaction between
   (a) a polyamine chosen from the group consisting of (1) a condensation product of tung acrolein adduct and a lower amine, (2) an amide-amine resin, (3) the partial reaction product of an amine and an epoxy resin, and (4) the reaction product of a lower polyamine and a methyl ester of a bodied drying oil, and
   (b) a polyanhydride,
      the ratio between the number of amine groups and the number of anhydride groups lying in the range of 3:1 to 1:4.

2. The coating of claim 1 wherein the equivalents of the amine groups and the anhydride groups are present in approximately equal amounts.

3. The coating of claim 1 wherein there is also a pigment carried by at least one of (a) or (b).

4. A substrate coated with a composition comprising the reaction product of the reaction between
   (a) a condensation product of tung acrolein adduct and a lower amine and
   (b) a polyanhydride,
      the ratio between the number of amine groups in the condensation product and the number of anhydride groups lying in the range of 3:1 to 1:4.

5. The coating of claim 4 wherein said lower amine is triethylene tetramine.

6. A substrate coated with a composition comprising the reaction product of the reaction between
   (a) a polyamine which is an amide-amine resin and
   (b) a polyanhydride,
      the ratio between the number of amine groups and the number of anhydride groups lying in the range of 3:1 to 1:4.

7. The coating of claim 6 wherein said polyamine is an amine-amide polymer fatty acid resin.

8. The coating of claim 6 wherein said polyamine is the reaction product of a polymerized fatty acid and ethylene diamine.

9. A substrate coated with a substrate comprising the reaction product of the reaction between
   (a) a polyamine which is the partial reaction product of an amine and an epoxy resin and
   (b) a polyanhydride,
      the ratio between the number of amine groups and the number of anhydride groups lying in the range of 3:1 to 1:4.

10. The coating of claim 9 wherein said polyamine is a condensation product of epoxy resin and a lower polyamine.

11. The coating of claim 10 wherein said lower polyamine is ethylene diamine.

12. A substrate coated with a composition comprising the reaction product of the reaction between
    (a) the reaction product of a lower polyamine and a methyl ester of a bodied drying oil and
    (b) a polyanhydride,
       the ratio between the number of amine groups in (a) and the number of anhydride groups lying in the range of 3:1 to 1:4.

13. The coating of claim 12 wherein said lower polyamine is triethylene tetramine and said drying oil is safflower oil bodied to a Z-8 viscosity.

14. The coating of claim 1 wherein the polyanhydride comprises the reaction product of a drying oil with maleic anhydride.

15. The coating of claim 14 wherein said polyanhydride is safflower oil maleic anhydride adduct.

16. The coating of claim 14 wherein said anhydride is linseed oil maleic anhydride adduct.

17. The coating of claim 1 wherein said polyanhydride is a polymer of methyl vinyl ether and maleic anhydride.

18. The coating of claim 1 wherein said polyanhydride is a styrene maleic anhydride polymer.

19. A method for applying a coating to a surface and rapidly curing the coating, comprising
    simultaneously spraying on said surface two reactive streams, each a solution at suitable viscosity for spraying,
    one said stream comprising as its main reactive ingredient a polyamine, having reactive primary or secondary amine groups,
    the other said stream comprising as its main reactive ingredient a polyanhydride,
    the ratio of amine groups to anhydride groups being between 3:1 and 1:4,
    the polyamine and the polyanhydride being chosen so that their solutions are mutually soluble in each other for at least a brief instant before they react and so that they become very viscous within ten seconds of direct mixing and gel within one minute.

20. The method of claim 19 wherein at least one said stream contains pigment.

21. The method of claim 19 wherein for each amine group there is approximately one anhydride group.

22. The method of claim 19 wherein said polyamine is chosen from the group consisting of
    (1) a condensation product of tung acrolein adduct and a lower amine,
    (2) an amide-amine resin,
    (3) the partial reaction product of an amine and an epoxy resin,
    (4) the reaction product of a lower polyamine and a methyl ester of a bodied drying oil, and
    (5) 4,4' diaminodiphenylmethane.

23. The method of claim 22 wherein said polyanhydride is chosen from the group consisting of
    (1) the reaction product of a drying oil with maleic anhydride,
    (2) a polymer of methyl vinyl ether and maleic anhydride,
    (3) a styrene maleic anhydride polymer.

References Cited

UNITED STATES PATENTS

| | | | |
|---|---|---|---|
| 3,098,051 | 7/1963 | Matt | 260—18 X |
| 3,240,762 | 3/1966 | Wilks et al. | 260—78.4 |
| 3,277,036 | 10/1966 | Whitworth et al. | |
| 3,298,972 | 1/1967 | Kern. | |
| 3,299,184 | 1/1967 | Whitworth et al. | |
| 3,352,714 | 11/1967 | Anderson et al. | 117—93.1 X |
| 3,356,648 | 12/1967 | Rogers. | |
| 3,360,502 | 12/1967 | Loncrini | 260—78.4 X |
| 3,422,076 | 1/1969 | Petropoulous et al. | 260—78.4 |

ALFRED L. LEAVITT, Primary Examiner

J. H. NEWSOME, Assistant Examiner